April 3, 1962   L. M. SHOWERS, JR., ETAL   3,027,927
AUTOMATIC ANTI-SKID CHAINS FOR VEHICLES
Filed Aug. 28, 1961   8 Sheets-Sheet 1

Fig. 1

INVENTORS
LEWIS M. SHOWERS Jr.
CHARLES T. BISCARDI

April 3, 1962  L. M. SHOWERS, JR., ET AL  3,027,927
AUTOMATIC ANTI-SKID CHAINS FOR VEHICLES
Filed Aug. 28, 1961  8 Sheets-Sheet 2

Fig. 2

INVENTORS
LEWIS M. SHOWERS JR.
CHARLES T. BISCARDI

April 3, 1962  L. M. SHOWERS, JR., ETAL  3,027,927
AUTOMATIC ANTI-SKID CHAINS FOR VEHICLES
Filed Aug. 28, 1961  8 Sheets-Sheet 4

Fig. 5

INVENTORS
LEWIS M. SHOWERS JR.
CHARLES T. BISCARDI

April 3, 1962     L. M. SHOWERS, JR., ET AL     3,027,927
AUTOMATIC ANTI-SKID CHAINS FOR VEHICLES
Filed Aug. 28, 1961                    8 Sheets-Sheet 7

INVENTORS
LEWIS M. SHOWERS JR.
CHARLES T. BISCARDI

April 3, 1962   L. M. SHOWERS, JR., ETAL   3,027,927
AUTOMATIC ANTI-SKID CHAINS FOR VEHICLES
Filed Aug. 28, 1961   8 Sheets-Sheet 8

Fig. 11

*INVENTORS*
LEWIS M. SHOWERS JR.
CHARLES T. BISCARDI

United States Patent Office 3,027,927
Patented Apr. 3, 1962

3,027,927
AUTOMATIC ANTI-SKID CHAINS FOR VEHICLES
Lewis M. Showers, Jr., 104 E. Essex Ave., Lansdowne, Pa., and Charles T. Biscardi, 19 E. Mill Road, Maple Shade, N.J.
Filed Aug. 28, 1961, Ser. No. 134,243
4 Claims. (Cl. 152—214)

This invention relates to a device to automatically apply or remove non-skid cross chains to or from the tread of a vehicle tire while the wheel is in motion in either direction. The controls are located within easy reach so that the operator may select the on (operative) or off (inoperative) position of the chains as required by the immediate road condition for each wheel. The power for applying or removing the chains is supplied by the rotation of the wheel, actuated by a friction means controlled by the operator. When the chains are in the operative or inoperative position they are automatically locked and the friction means released materially reducing the drag on the friction means thus notifying the operator that the operation is complete.

Many attempts have been made in the past to fulfill the need of an automatic tire chain, some of which disclosed novel principles.

It is an object of this invention to supply a more practical means of fulfilling this need than anything disclosed in the past.

It is a further object of this invention to provide a demountable wheel unit, complete with all the automatic mechanism, which can be secured to the axle of a vehicle using the same fastenings and interchangeable with the present standard equipment. The control equipment being permanently mounted on the vehicle.

It is a further object of this invention to add to the safety of winter driving and reduce the wear on chains and roadway by removing the chains when bare road is encountered.

It is a further object of this invention that chains may be applied or removed while the vehicle is moving forward or backward.

It is a further object of this invention that chains may be applied or removed on a spinning wheel when the vehicle is stalled.

Other advantages of construction and operation will be apparent from the following description, taken in connection with the accompanying drawings, illustrating the present preferred embodiment of this invention.

In describing this invention the inside is presumed to be the portion toward the vehicle, the outside is away from the vehicle. The rotational directions clockwise and counterclockwise are designated when facing the outside of the wheel.

Figure 1:
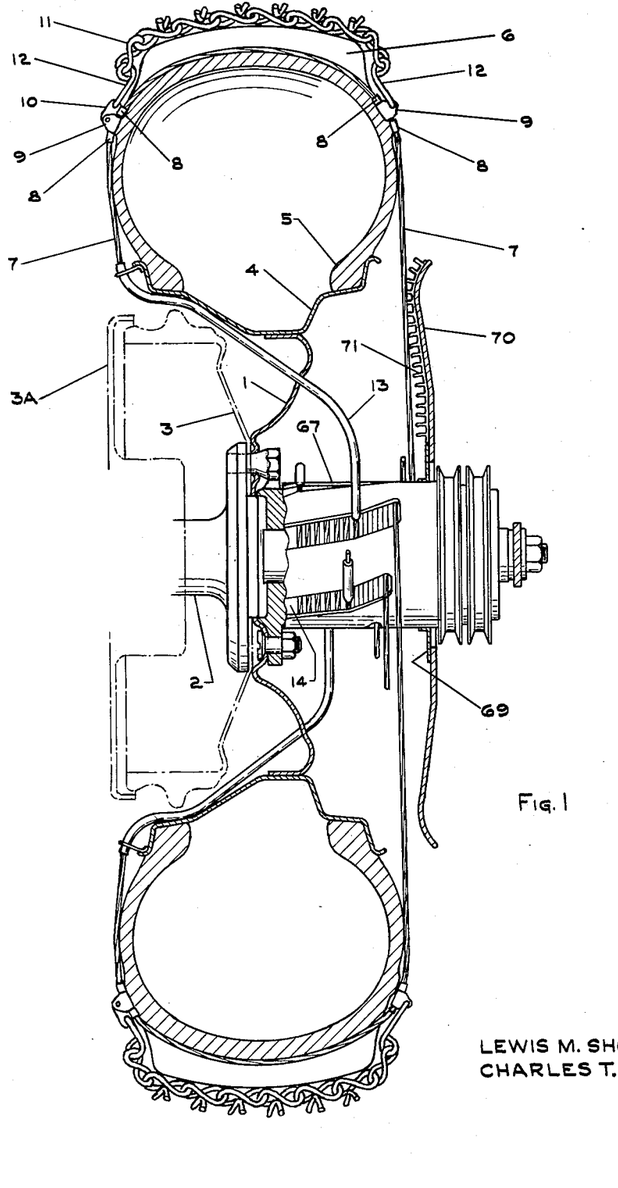
FIGURE 1 is a sectional view of a vehicle wheel showing the chains in the on or operative position and the mechanism of this invention attached to the wheel.

Referring to FIG. 1 in which 1 is a demountable wheel with a convention mounting on an axle 2, this drawing also shows a brake drum 3 and a brake reaction plate 3A for the purpose of clarity. The wheel 1 has a rim 4 to accommodate a pneumatic tire 5 which should be of a type commonly known as a snow tire, having a heavy non-skid tread and of such design so as to provide for a plurality of equally spaced transverse grooves 6 to accommodate chain cables 7 which are slidably laid in said grooves 6. Said grooves 6 are somewhat wider than cables 7 to allow cable ferrules 8, cable clevis 9 and chain link 10 to pass thru said groove 6 when anti-skid cross chains 11 are moved on and off the tread of tire 5. Cross chains 11 are mounted in pairs and are attached to chain cables 7 by means of chain spreaders 12 which displace the said chains 11 on either side of groove 6 to prevent wear on the sides of the grooves and give a better distribution of cross chains 11. Cables 7 form loops surrounding the cross section of the tire 5 and rim 4, the inside of the loop passing thru cable guide 13 to the outside of wheel 1, where the ends of the cable loops 7 are secured to cable drum 14, FIG. 2. The outer circumference of cable drum 14 is provided with a plurality of annular grooves 15, to accommodate cables 7. Each end of each cable 7 enters an assigned groove 15 tangent to the outside surface of the drum 14. The outside end portions of cables 7 wrap around cable drum 14 in a clockwise direction; the inside end portions wrap in a counter-clockwise direction. The ends of cables 7 are secured to drum 14 and are of such length and drum 14 is of such circumference so that somewhat less than a complete revolution of drum 14 relative to wheel 1, will wind one end of cables 7 and unwind the other end of cables 7 for sufficient length so as to move chains 11 FIG. 1, from the predetermined operative position to the inoperative position and vice versa.

Figure 2:
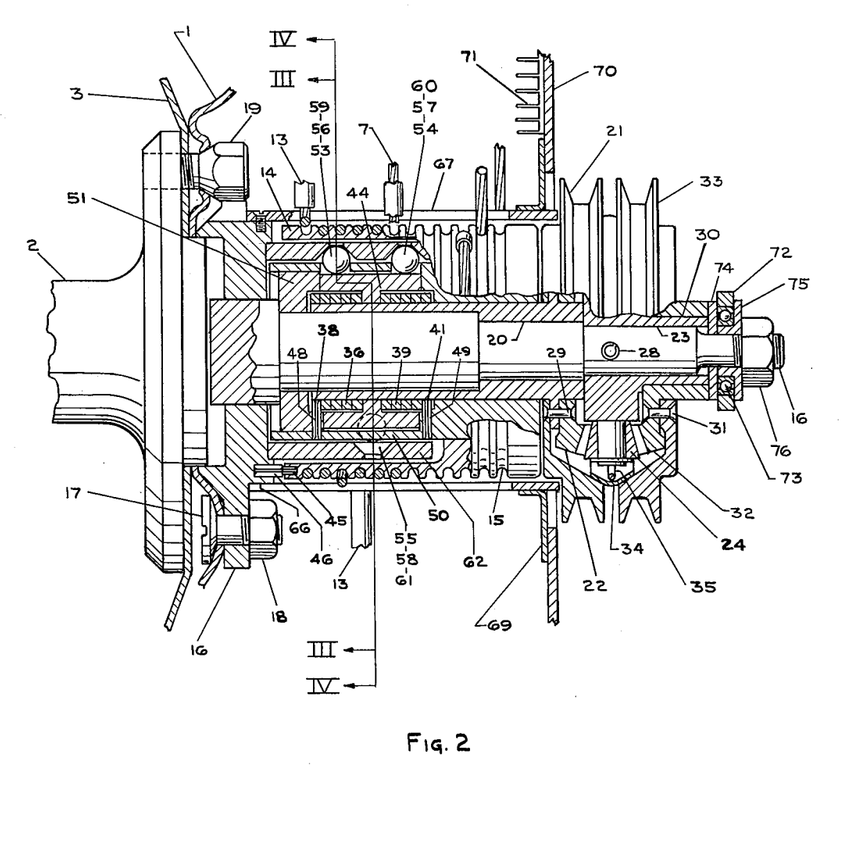
FIGURE 2 is an enlarged sectional view of the hub mechanism.
Figures 3, 4:
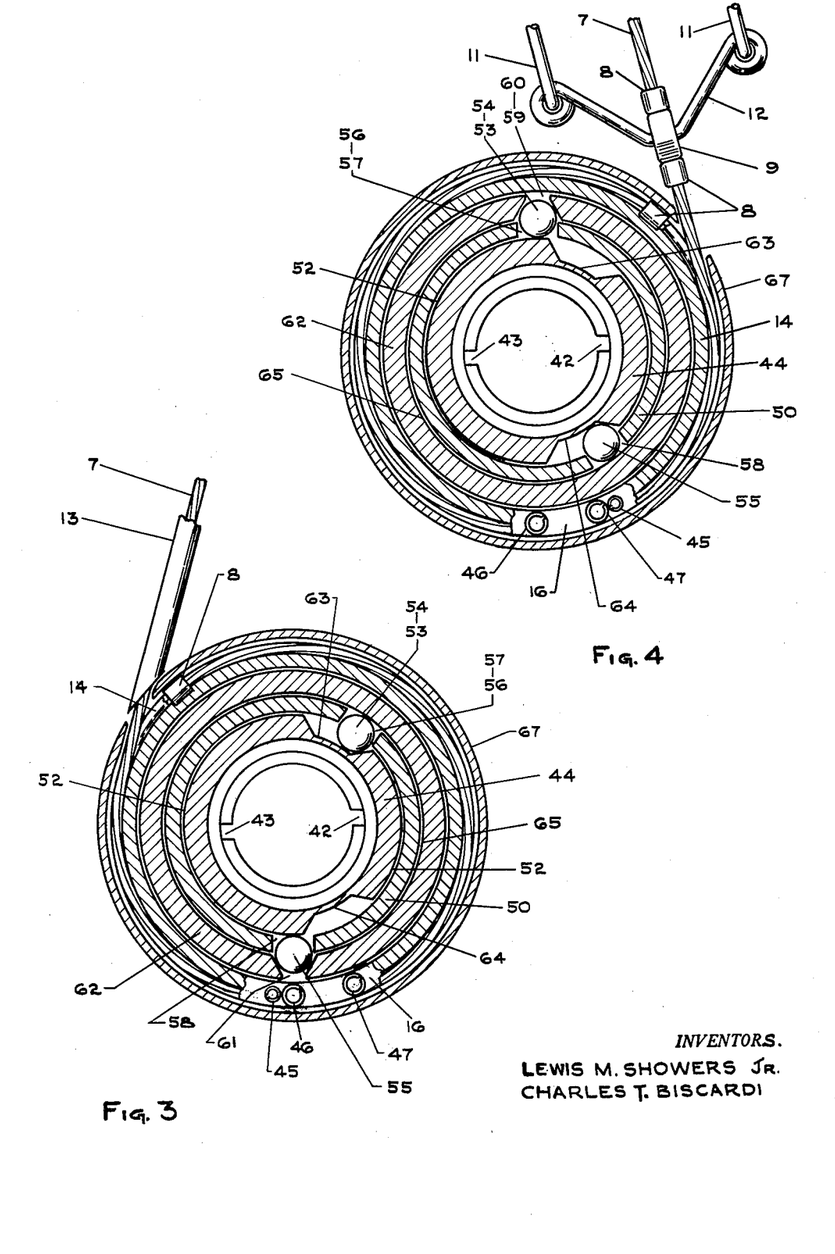
FIGURE 3 is a sectional view taken along lines III—III of FIG. 2.
FIGURE 4 is a sectional view taken along lines IV—IV of FIG. 2 with chains in the inoperative position.
Figure 5:
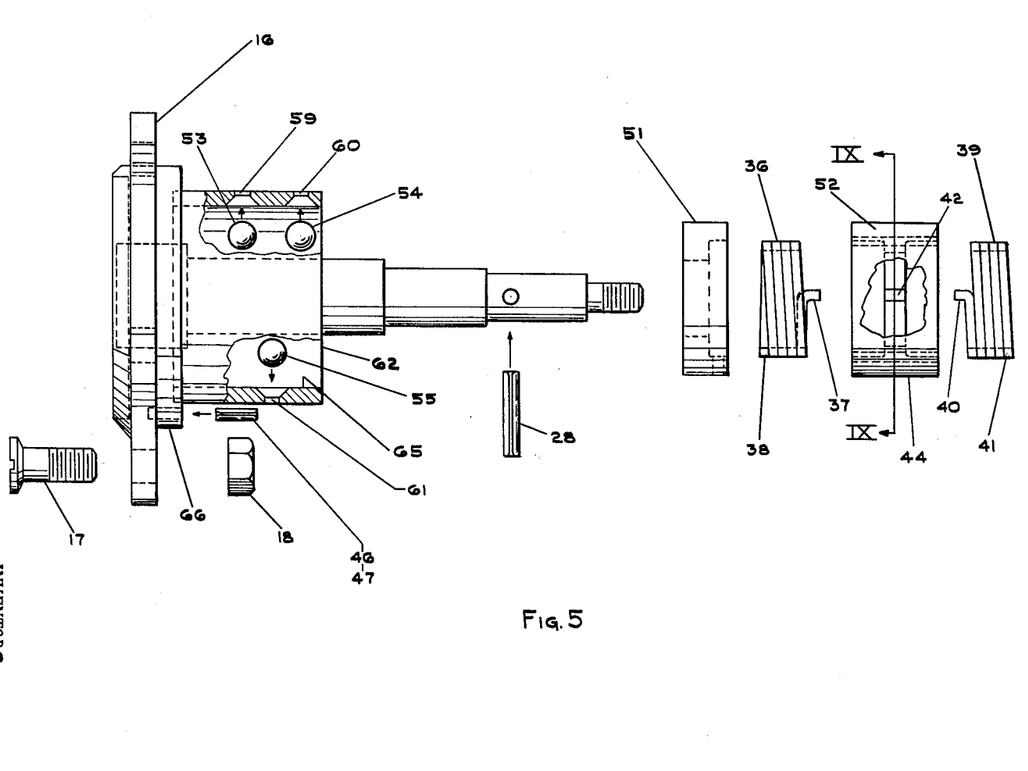
FIGURE 5 is an exploded view of spindle and spring clutch parts.
Figure 6:
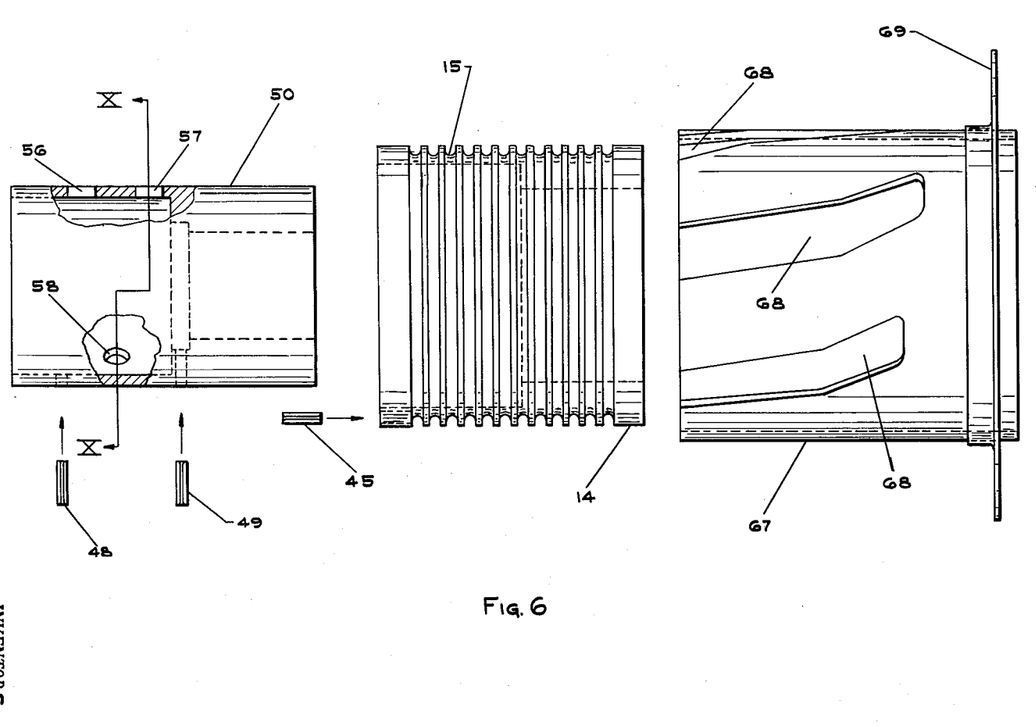
FIGURE 6 is an exploded view of cable drum parts.
Figure 7:
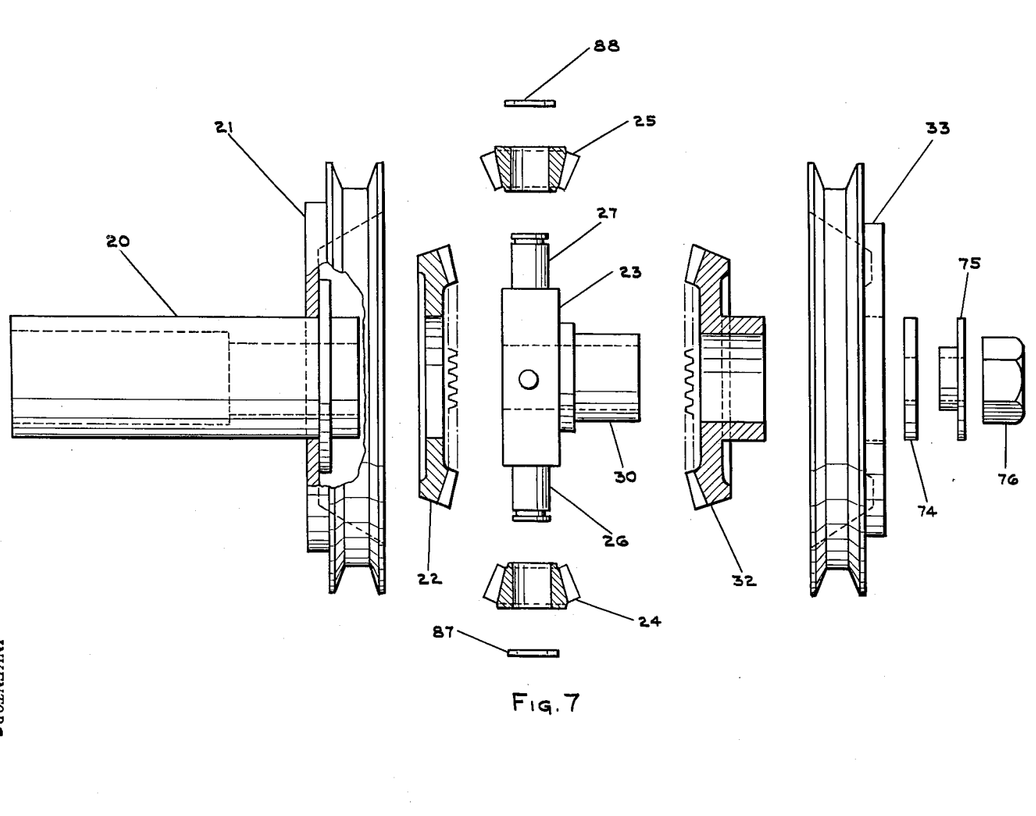
FIGURE 7 is an exploded view of differential parts.
Figure 8:
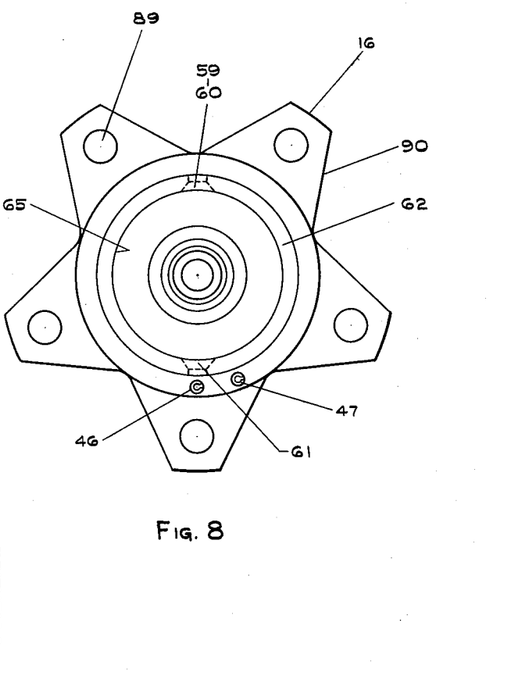
FIGURE 8 is an end view of spindle 16 FIG. 5.
Figure 9:
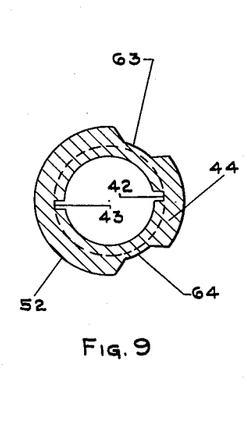
FIGURE 9 is a sectional view of cam collar 44 taken along lines IX—IX FIG. 5.
Figure 10:
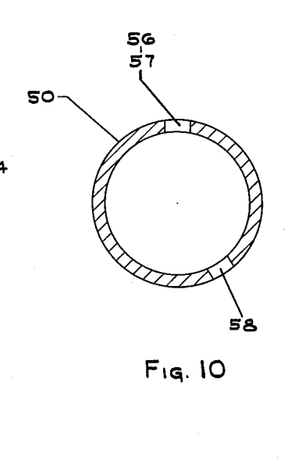
FIGURE 10 is a sectional view of cable drum support 50 taken along lines X—X FIG. 6.

The hub of this mechanism FIG. 2 which is the heart of this invention, the parts of which are shown in greater detail in exploded views FIG. 5, 6 and 7 and sections FIGS. 3 and 4, which will be referred to from time to time to clarify the description, consists of a spindle 16 semi-permanently mounted on the axis of the wheel 1 and extending outward. The spindle 16 is secured by a plurality of bolts 17 and nuts 18 thru holes 89 in the spider flanges 90 of spindle 16 FIG. 8. These bolts are arranged to alternate with mounting bolts 19 of wheel 1 FIG. 2, making this invention interchangeable with a standard wheel. Rotatably mounted on spindle 16 is a sleeve 20 carrying on its outward end an inward friction sheave 21 and an inward side gear 22 of a differential gearing 20, 21 and 22 being permanently fastened together by rivets 29. The spider 23 carries two pinion gears 24 and 25 retained on their bearings 26 and 27 FIG. 7 by snap rings 87 and 88. Spider 23 is secured from turning on spindle 16 FIG. 2 by pin 28. Rotatably mounted on a cylindrical portion 30 of spider 23 is an outer side gear 32 and an outer friction sheave 33, which are secured to each other by means of rivets 31. The space between inner and outer sheaves 21 and 33 is sealed to retain the grease and exclude the dirt by a circular ring 34 made of pliable material held in place against the inside circumference of sheaves 21 and 33 by an outwardly expanding spring ring 35. Mounted on and tightly wound around near the inner end of sleeve 20 are inner spring clutch 36 and outer spring clutch 39. These clutches are both wound right hand and are identical. The outer end of clutch 36 has a bent end 37 FIG. 5 extending outward and parallel to the axis, the inner end 38 being cut square. The inner end of clutch 39 has a bent end 40 extending inward and parallel to the axis, the outer end 41 being cut square. The bent end of clutch 36 engages slot 42 in cam collar 44 FIGS. 5 and 9 to drive cam collar 44 when sleeve 20 is moved in a clockwise direction in respect to wheel 1. The bent end 40 of clutch 39 engages slot 43 in cam collar 44 to drive cam collar 44 when sleeve 20 is moved in a counter-clockwise direction in respect to wheel 1.

Referring to section view FIG. 3 taken along lines III—III FIG. 2, shows the cable drum 14 locked to wheel 1 with chains 11 in the operative position. Cam collar 44 is in the extreme counter-clockwise position relative to wheel 1. In this position drum stop 45 has engaged spindle stop 46 and square end 41 of clutch 39 has engaged stop 49 FIG. 2 releasing clutch 39. Drum 14 and cable drum support 50 FIG. 6 are shown as separate pieces for ease of machining but become a single unit when pressed together. With clutch 39 released, sleeve 20 can rotate in a counterclockwise direction after having pulled chains 11 to the operative position.

As is shown in FIG. 3, the outside surface 52 of the cam collar 44 retains sprag 55 in hole 58 of drum support 50 and depression 61 in cylindrical outward projection 62 of spindle 16, thus locking the cable drum 14 from annular movement relative to wheel 1.

A slight clockwise movement of collar 44 moves cam surface 64 of collar 44 under sprag 55 allowing it to clear depressions 61 unlocking cable drum 14, a still further rotation of collar 44 moves cam surface 63 of collar 44 against sprags 53 and 54 picking up and rotating drum 3 by means of sprags 53 and 54 and holes 56 and 57 respectively in drum support 50. Sprags 53 and 54 being confined by inner cylindrical surface 65 of cylindrical projection 62 of spindle 16. This motion can continue turning cable drum 14 in a clockwise direction, unwrapping one end of cables 7 and wrapping the other end of cables 7 until drum stop 45 engages spindle stop 47 of spindle 16, FIG. 4, in which position sprags 53 and 54 can enter depressions 59 and 60 respectively in spindle cylindrical projection 62 of spindle 16. A further clockwise movement of collar 44 forces sprags 53 and 54 outward by means of cam surface 63 on collar 44 and moves outside cylindrical surface 52 of collar 44 under sprags 53 and 54, thus locking drum 14 to spindle 16 by way of cable drum support 50. At the same time the square end 38 of spring clutch 36, FIG. 2, contacts stop 48 of cable drum support 50 and clutch retainer ring 51, releasing sleeve 20 and allowing it to turn freely.

Mounted and secured to a circular shoulder 66 on spindle 16, FIG. 5, is a cylindrical cable drum cover 67, FIGS. 2 and 6, provided with a plurality of openings 68, FIG. 6, through which cables 7 extend. Cover 67 is provided on its outward end with a radial flange member 69, which in turn supports a demountable disc 70, FIG. 1. The inside of disc 70 is preferably covered with a sound deadening mat 71.

The outside end of spindle 16, FIG. 2, carries one end of a friction means reaction arm 72, by means of bearing 73 and collars 74 and 75 and nut 76.

Figure 11:
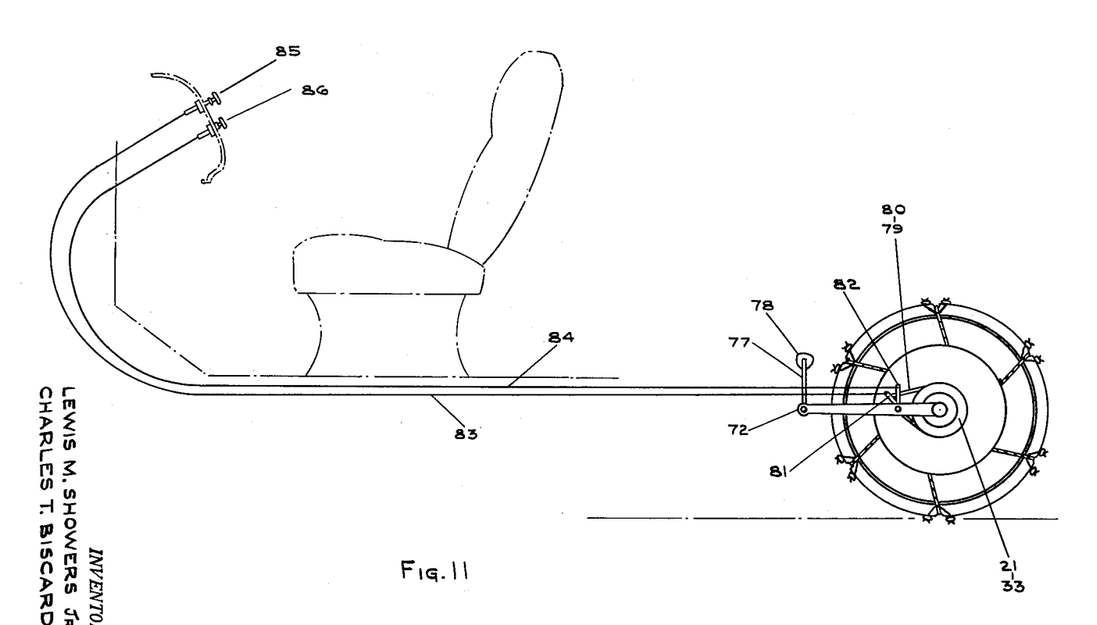
FIGURE 11 is a schematic view of the control arrangement.

FIG. 11 shows a schematic view of a control mechanism in which 72 is the friction reaction arm, the forward end being supported by link 77 suspended and demountable at 78, attached to the car body. Parts 79 and 80 are friction loops around inner friction sheave 21 and outer friction sheave 33 FIG. 2. Parts 81 and 82 FIG. 11 are inner and outer friction application levers and are demountably attached to control cables 83 and 84, which terminate in pull buttons 85 and 86 within easy reach of the operator.

In the operation of this invention, we will assume that the vehicle is moving from right to left and we are looking at the left hand rear wheel which is turning in a counter clockwise direction, the chains are in the inoperative position and we wish to apply them.

Under these conditions we would pull on button 86 FIG. 11 which in turn would pull on cable 84 and lever 82 applying a braking force through outer friction loop 80 to outer friction sheave 33 FIG. 2. Retarding sheave 33 also retards outer side gear 32. Spider 23 being pinned to spindle 16 which is bolted to wheel 1, rotates with wheel 1. Pinion gears 24 and 25 mounted on spider bearings 26 and 27 respectively and in mesh with side gears 32 and 22 revolve on their axis when ring gear 32 is retarded relative to spider 23. The differential action of pinions 24 and 25 increases the annular velocity and displacement of inner side gear 22 relative to the spider 23 and wheel 1, to the same extent as the retarding force decreases the annular velocity and displacement of outer side gear 32. Inner side gear 22 is secured to inner sheave 21 and sleeve 20 which rotate as a unit. We now have sleeve 20 rotating counter-clockwise at a somewhat greater velocity than wheel 1.

Outer spring clutch 39, being tightly wound around sleeve 20 in a clockwise direction, from outside to inside, grips sleeve 20. Bent end 40 of clutch spring 39 being engaged in slot 43 of cam collar 44 causes cam collar 44 to rotate with sleeve 20. Inner spring clutch 36 has no function in a counter-clockwise rotation of sleeve 20, so it floats with sleeve 20.

With the chains 11 in the inoperative position FIG. 4 sprags 53 and 54 are disposed in depressions 59 and 60 of spindle cylindrical projection 62 and holes 56 and 57 of cable drum support 50, thus locking cable drum 14 to spindle 16. Sprag 55 is disposed in cam recess 64 and hole 58 in cable drum support 50, confined by inner cylindrical surface 65 of cylindrical projection 62 of spindle 16.

The first slight counter-clockwise movement of cam collar 44 removes supporting outside surface 53 of cam collar 44, from a position under sprags 53 and 54, allowing them to recede from locking position, this movement also moves cam recess 64 to the driving position in contact with sprag 55. Further movement of cam collar 44 rotates drum support 50 and cable drum 14 by means of sprag 55.

When cable drum 14 has made somewhat less than one revolution, relative to wheel 1, in a counter-clockwise direction, chain cables 7 will have unwrapped from right hand side of drum 14 and wrapped on left hand side of drum 14, moving a sufficient distance so that loops of cables 7 FIG. 1 passing over tire 5 will have moved the attached chains 11 from the inoperative to the operative position on tire 5. At this point cable drum stop 45 FIG. 3 on cable drum 14 contacts spindle stop 46 on spindle 16 stopping the movement of drum 14. Driving sprag 55 has moved over locking depression 61 in projection 62 of spindle 16. Slightly further movement of cam collar 44 forces sprag 55 to move up cam 64 of cam collar 44 until outside surface 52 of cam collar 44 confines sprag 55, locking drum 14 from movement in either direction relative to wheel 1. With cam collar 44 FIG. 2 in this locked position the square end 41 of outer spring clutch 39 contacts outer release stop 49 of drum support 50 uncoiling spring clutch 39 slightly, thereby releasing sleeve 20 so that it will rotate freely until operator releases pull button 86.

With the chains 11 in the operative position, to move them to the inoperative position, radially disposed from the hub on the outside of the wheel, the operator would pull on button 85 FIG. 11, which in turn would pull on cable 83 and arm 81 applying a friction force through 79 to the inside friction sheave 21 FIG. 2. Retarding friction sheave 21 retards sleeve 20 which are secured together. Sleeve 20 is now moving clockwise relative to spindle 16 and wheel 1. Inner spring clutch 36, being tightly wound around sleeve 20 in a clockwise direction from the inside to the outside, grips sleeve 20, bent end 37 engaging slot 42 FIG. 5 cam collar 44 causes cam collar 44 to rotate with sleeve 20 FIG. 2.

With the chains in the operative position FIG. 3 sprag 55 is disposed in depression 61 of spindle cylindrical projection 62 and hole 58 of cable drum support 50, thus locking cable drum 14 to spindle 16. Sprags 53 and 54 are disposed in cam recess 63 and holes 56 and 57 in cable drum support 50, confined by inner cylindrical surface 65 of spindle 16. The first slight clockwise movement of cam collar 44 removes supporting outside surface 52 of cam collar 44 from position over sprag 55 allowing it to recede from the locking position, this movement also moves cam recess 63 to the driving position in contact with sprags 53 and 54. Further movement of cam collar 44 rotates drum support 50 and cable drum 14 by means of sprags 53 and 54.

When cable drum 14 has made somewhat less than one revolution, relative to wheel 1, in a clockwise direction chain cables 7 FIG. 1 will have unwrapped from the left hand side of drum 14 and wrapped on the right hand side of drum 14 moving sufficient distance so that loops of cables 7 passing over tire 5 will have moved the attach chains 11 from the operative to the inoperative position, radially disposed on outside of wheel 1. At this point cable drum stop 45 FIG. 4 on cable drum 14 contacts spindle stop 47 on spindle 16, stopping the movement of drum 14. Driving sprags 53 and 54 have now moved over locking depressions 59 and 60 in cylindrical projection 62 of spindle 16. Slightly further movement of cam collar 44 forces sprags 53 and 54 to move up cam 63 of cam collar 44 until the outside surface 52 of cam collar 44 confines sprags 53 and 54 locking drum 14 from movement in either direction relative to wheel 1. With cam collar 44 FIG. 2 in the locked position the square end 38 of inner spring clutch 36 contacts outer release stop 48 of drum support 50 uncoiling spring clutch 36 slightly, thus releasing sleeve 20 so that it will rotate freely until the operator releases pull button 85.

Although the preferred embodiment of this invention is equipped with an outboard control it will be readily recognized, by those skilled in the art, that a somewhat better arrangement could easily be devised, without departing from the spirit of this invention, using an inboard control mechanism.

The outboard control is for application to existing vehicles, while the inboard control would be applicable to future vehicles designed for automatic chains.

The inboard control would require the co-operation of the vehicle manufacturer to supply the control mechanism, incased in the brake drum, with necessary control extensions to within the operator's reach.

Having thus described our invention we claim:

1. In an automatic antiskid chain for a vehicle complete with wheel rim and tire, having a permanently attached spindle extending outwardly and located on the axis of said wheel for the support and annular guidance of parts, in combination, a differential gear, a sleeve attached to a friction sheave and a side gear of said differential, the other side gear of said differential being attached to another friction sheave which in turn is arranged to rotate on said spindle, the spider carrying the pinions of said differential being keyed to said spindle, two spring clutches one on either side of a cam collar with ends bent to engage slot in said collar, a retaining ring for said clutches and said collar, a non-skid chain cable drum having a cylindrical portion surrounding said collar, said cylinder having two sets of holes to accommodate two sets of driving sprags, one set for annular movement in one direction relative to said spindle, the other set for annular movement in the other direction a cylindrical portion projecting from said spindle surrounding a cylindrical portion of said cable drum, having pockets for said sprags, stops extending from said cable drum engaging ends of said spring clutches and stop for said drum to limit the annular travel in relation to said spindle, plurality of cable grooves around the outside surface of said drum to accommodate anti-skid chain cables, guides for said cables extending through said wheel, sections of anti-skid chain attached to said cables, a plurality of grooves transversely across the tread of said tire to accommodate said cables, ends of said cables, ends of said cables wrapped in opposite direction around the outside and attached to said drum, a cylindrical cover surrounding said cable drum and attached to said spindle having openings to accommodate said cables, a guard disc radially extending outward from said cover and located to accommodate said cables, a friction reaction arm arranged to apply a retarding force selectively to said friction sheaves when actuated by the vehicle operator, in which, when the vehicle wheel is rotating, and sufficient retarding force is applied to one said friction sheave the said chains will move to an operating position on the tread of said tire and when a sufficient retarding force is applied to the other said sheave the said chains will move to an inoperative position off the tread of said tire.

2. In an automatic anti-skid chain for a vehicle as set forth in claim 1, in which oscillation of an annular grooved cable drum with its axis on the axis of the wheel, will move anti-skid cross chains onto and off of the tread of said vehicle tire.

3. In an automatic anti-skid chain for a vehicle as set forth in claim 2 whereby the cable drum is automatically locked from appreciable movement in either direction, when at its extreme travel at either end of its oscillation until released by the operator.

4. In an automatic anti-skid chain for a vehicle as set forth in claim 1 whereby the cross chain carrying cables pass from the inside to the outside of the wheel through a conductor tube secured to the wheel.

References Cited in the file of this patent

UNITED STATES PATENTS

| 2,727,553 | Berueffy | Dec. 20, 1955 |
| 2,754,874 | Gardner | July 17, 1956 |
| 2,900,002 | Ecker | Aug. 18, 1959 |